United States Patent
Doane

[15] 3,662,415
[45] May 16, 1972

[54] METHOD OF MAKING FOOTWEAR HAVING INSOLE AND INTERMEDIATE SOLE OF THREE-DIMENSIONAL SHAPE

[72] Inventor: Ernest E. Doane, 129 Highfield Rd., Abington, Mass. 02351

[22] Filed: June 12, 1970

[21] Appl. No.: 48,858

Related U.S. Application Data

[63] Continuation of Ser. No. 822,826, Apr. 8, 1969, abandoned, which is a continuation-in-part of Ser. No. 478,923, Aug. 11, 1965, abandoned.

[52] U.S. Cl. ............................................................12/145
[51] Int. Cl. ......................................................A43d 21/00
[58] Field of Search............................12/142 R, 145; 264/244

[56] References Cited

UNITED STATES PATENTS

| | | | |
|---|---|---|---|
| 3,137,749 | 6/1964 | Bingham, Jr. | 264/244 |
| 3,246,068 | 4/1966 | Ferreira | 264/244 |
| 3,436,781 | 4/1969 | Becka et al. | 12/145 |
| 3,441,643 | 4/1969 | Tusa et al. | 12/145 X |

*Primary Examiner*—Patrick D. Lawson
*Attorney*—Kenway, Jenney & Hildreth

[57] ABSTRACT

The process of shoemaking by which the steps of molding a flat mulled insole by direct contact to the contoured bottom of a wooden last and at the same time completing the shoe by forming an outsole and bonding it to the molded insole.

2 Claims, 3 Drawing Figures

PATENTED MAY 16 1972 3,662,415

INVENTOR.
ERNEST E. DOANE
BY

METHOD OF MAKING FOOTWEAR HAVING INSOLE AND INTERMEDITE SOLE OF THREE-DIMENSIONAL SHAPE

This application is a continuation of application Ser. No. 822,826 filed Apr. 8, 1969, now abandoned, which is a continuation-in-part of my prior application, Ser. No. 478,923 filed Aug. 11, 1965, now abandoned.

This invention comprises a new and commercially valuable process of shoemaking by which two conventional steps heretofore performed separately by different operators, using machines of diverse type are now combined and carried out simultaneously in one operation by one operator instead of two, with the assistance of a single injecting molding machine and at substantially less cost to the manufacturer than heretofore.

Of the two operations now combined the first is the insole molding step. Prior to this invention insoles were molded as articles entirely separate from the rest of the shoe. They were molded between steel mold plates — one pair of plates for rights and another pair for lefts. These mold plates are very expensive and under the best conditions do not always conform the molded insole to the particular last with which that insole was eventually used in finishing the shoe.

An insole, premolded between steel mold plates, is of stiff consistency and so tends to bridge any hollow or concavity in the last bottom rather than conforming to them.

In conventional shoemaking the premolded insole is spotted on the last bottom by hand and tacked in place. This operation introduced an opportunity for a defect in the shoe. If the premolded insole happens to be displaced longitudinally or transversely with respect to the bottom of the wooden last the fine lines of the last are lost in the finished shoe.

The present invention both obviates these difficulties and results in an important savings in manufacturing costs.

It molds each insole to the contoured bottom of the individual wooden last with which it is to be used with absolute accuracy of position and contour. This is true even when the wooden lasts reach the operator at random and with bottoms of various contours. Insoles premolded between iron mold plates permit no such refinement of shoemaking. They must be forced into approximately registering position regardless of differences between the contours of the iron mold plate and the wooden last bottom.

These objections are obviated by the process of the present invention and important advantages in shoemaking are achieved. The process is characterized by the employment of a conventional insole of substantially uniform thickness to which the upper may be flat lasted. The lasted shoe bottom is now assembled so that it constitutes one side of a mold in which is inserted a preformed and perforated leather sole. A viscous vinyl compound, such as PVC, is now injected through a hole provided for the purpose in the leather sole piece and fluid pressure is built up in the mold cavity between the two sole pieces (i.e. the inserted leather sole and the insole) sufficient to mold the insole into conformity with the curved and contoured last bottom.

It will be seen that in one aspect the process is characterized by the step of molding a flat insole into the three-dimensional contour of a last bottom by fluid pressure applied directly to the outer surface of the insole in the usual course of manufacture. No preliminary molding or building up of the insole with additional material is required and by combining these two otherwise unrelated steps a distinct saving thus results in manufacturing cost.

In another aspect the present invention constitutes the extension into a new field of the injection molding process disclosed and claimed in U.S. Pat. No. 3,178,496 Apr. 13, 1965, Ferreira, wherein a preformed and perforated leather sole is incorporated in a lasted shoe bottom in a matrix of a vinyl compound but in the process of that patent the insole is not subjected to any molding treatment whatever.

These and other features of the invention will be best understood and appreciated from the following description of a preferred manner of carrying out the process, selected for purposes of illustration and shown in the accompanying drawings, in which -

Figure 1:
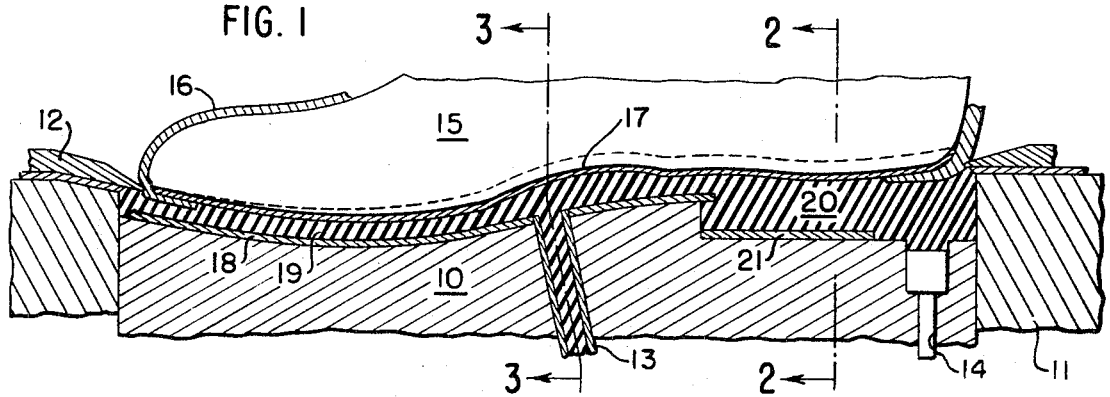
FIG. 1 is a view in longitudinal section of assembled mold and shoe parts.
Figure 2:
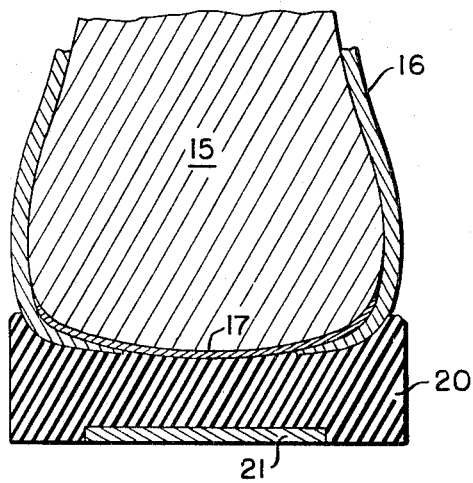
FIG. 2 is a view in cross section through the heel seat portion of the assembly.
Figure 3:
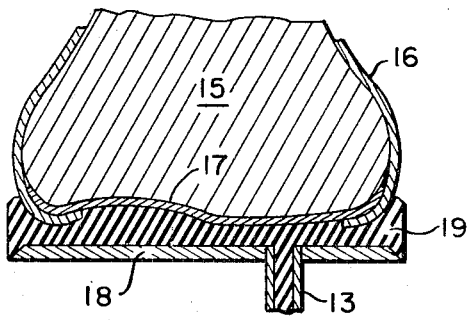
FIG. 3 is a view in cross section on the line 3—3 of FIG. 1.

As shown in FIG. 1 the mold as a whole comprises a fixed or bottom mold plate 10 and cooperating side molds 11 to which are secured inwardly beveled welt plates 12. The mold plate 10 has a continuous surface for forming the tread face and shank portions of the outsole and this may be knurled if desired. The rear end of the mold plate 10 is herein shown as shaped to mold the outsole with an integral heel and this may be of any desired height or shape.

The first step of the process as herein illustrated consists in placing and securing a perforated preformed sole piece of leather upon the forepart of the mold plate 10. It is important that the sole should be held in fixed position against the possibility of being displaced in the mold by the flow of the injected plastic in fluid state under substantial pressure.

As herein shown a tubular nozzle 13 projects through the mold plate 10 a sufficient distance to enter and fit snugly within a perforation provided for that purpose in the sole piece. As herein shown the nozzle is positioned substantially mid-way in the length of the sole. The mold plate 10 is also provided with an outlet passage 14 at its heel end through which air from the enclosed mold cavity may be exhausted to the atmosphere during the injection step. The location of the inlet nozzle 13 and the registering hole in the leather sole in a mid-position with respect to the shoe bottom is desirable and important to the successful practice of the novel process herein disclosed in that the distance of flow of the injected PVC is thus reduced to a minimum. It is at no point more than one-half the length of the shoe bottom and therefore requires less time to fill the mold cavity than if, for example, it were injected from the heel end of the mold. Moreover, in this centralized flow the PVC does not encounter as an obstacle the transverse shoulder of the mold plate at the heel breast line.

In the accompanying drawings the last 15 is represented as having a bottom surface of three-dimensional contour. That is to say, its heel seat portion is shaped to produce a concave cavity, the shank portion is concave to form a corresponding longitudinal arch for the wearer and at other points to form a dome to support the metatarsal arch. An insole 17 of substantially uniform thickness is tacked to the bottom of the last 15 in the usual manner and to it is lasted the upper 16. Preferably the insole is dampened or mulled to facilitate molding.

A leather sole piece 18 is secured to the mold plate 10 by the nozzle 13 or other holding means and is disposed in spaced relation from the insole 17. A viscous plastic such as hot PVC is now injected through the nozzle 13 and into the mold cavity defined by the insole 17 and the leather sole 18 as well as the heel area. Fluid pressure is now built up between the two sole members forcing the mulled insole 17 against the last bottom and molding it accurately to the contour thereof. Injection is carried on until a complete layer 19 of PVC is formed and the molded contour of the insole is maintained by curing and solidifying the PVC. The dotted line in FIG. 1 shows how the marginal edges of the insole 17 have been molded upwardly about the curved edge of the last to provide a heel-fitting recess for the wearer.

It will be understood that the mold members are unheated and that the hot plasticized PVC becomes cured and solidified while maintained under pressure and allowed to cool during an interval of 3 to 5 minutes. During this time a secure and permanent bond is formed between the sole piece 18 and the molded insole 17 together with the interposed over-lasted margin of the upper.

The leather sole piece 18 extends rearwardly beyond the heel breast line so that it is securely anchored beneath the heel 20 which is molded of PVC. The heel may include an insert 21 of leather or wear-resisting material. If desired the sole piece 18 may be beveled about its edge.

The sole piece 18 may be of solid standard sole leather since the injection temperature is not high enough to damage such leather, or it may be of Neolite or any suitable outsole material. The insole 17 similarly may be of leather, fibre or any moldable insole material.

While there are obvious advantages in using an insole of uniform thickness, it would be within the scope of the invention to modify the insole by attaching a marginal rand or the like.

It will be apparent that the injected layer or ply 19 of PVC compensates for the different and diverging contours of the last bottom, on the one hand, and the substantially flat contour of the solid leather sole piece on the other hand.

A plastic compound well suited for the described process is polyvinyl chloride, herein referred to as PVC, and this may be plasticized to develop a more or less rubbery texture and to be compatible with the cement coating usually applied to the insole 17. My novel process is not, however, limited to the employment of PVC but may be carried out with other vinyl or synthetic resinous compounds having equivalent properties.

Having thus disclosed my invention, I claim as new and desire to secure by Letters Patent:

1. The method of manufacturing footwear which includes the steps of placing a tread sole on the bottom of a mold, securing a substantially flat unmolded but moldable insole to a three-dimensional foot contoured bottom surface of a wooden last, lasting an upper on the last with the lasted margin of the upper overlying the peripheral margin of the unmolded insole, placing the lasted upper and insole in the mold in spaced relation to the tread sole, injecting a hot viscous plastic compound into the space between the tread sole and unmolded insole with sufficient force to mold the insole to the three-dimensional contoured bottom surface of the last and to fill the space and contact the lasted margin of the upper, insole and tread sole, permitting the plastic compound to solidify while maintaining the lasted upper in the mold, thereby bonding the upper, insole and tread sole together and maintaining the insole to the shape of the contoured bottom surface of the last, and removing the finished footwear from the mold.

2. The method as set forth in claim 1 wherein the tread sole is formed of leather and the hot viscous plastic compound is polyvinyl chloride.

* * * * *